United States Patent
Siddons

[15] 3,676,437
[45] July 11, 1972

[54] RECOVERY OF PURE CEPHALEXIN

[72] Inventor: Phillip Thomas Siddons, Pinner, England

[73] Assignee: Glaxo Laboratories Limited, Greenford, Middlesex, England

[22] Filed: Aug. 10, 1970

[21] Appl. No.: 62,706

[30] Foreign Application Priority Data

Sept. 26, 1969  Great Britain......................47,571/69

[52] U.S. Cl. .........................................260/243 C, 424/246
[51] Int. Cl. .......................................................C07d 99/24
[58] Field of Search ..............................................260/243 C

[56] References Cited

UNITED STATES PATENTS

| | | | |
|---|---|---|---|
| 3,531,481 | 9/1970 | Pfeiffer | 260/243 C |
| 3,502,663 | 3/1970 | Barnes | 260/243 C |

Primary Examiner—Nicholas S. Rizzo
Attorney—Bacon & Thomas

[57] ABSTRACT

A process for the purification of crude cephalexin comprises contacting a crude acidic aqueous solution of cephalexin with methanol, adjusting the pH of the solution to about 4 to initiate crystallization of the cephalexin and separating off the mother liquor after crystallization has taken place.

1 Claim, No Drawings

RECOVERY OF PURE CEPHALEXIN

This invention relates to a process for the purification of 7β-(D-2-aminophenylacetamido)-3-methylceph-3-em-4-carboxylic acid (common name cephalexin).

The cephalosporin compounds referred to in this specification are generally named with reference to cepham (see J.A.C.S. 1962, 84, 3400 and J.Chem.Soc. 1965, 5031). The term "cephem" refers to the basic cepham structure with one double bond.

Cephalexin may be prepared e.g. by reduction with zinc/acid, of 2,2,2-trichloroethyl 7β-[D(-)-N-(2,2,2-trichloroethyoxycarbonyl)-2-aminophenylacetamido]-3-methylceph-3-em-4-carboxylate or the like precursor. Such precursors may be obtained from penicillin compounds by a multi-stage method involving ring expansion of a penicillin compound such, for example, as is described in U. S. Pat. No. 3,275,626. During such a reduction step impurities remain in the acidic aqueous solution of cephalexin obtained with the result that the solution must undergo further purification. Acidic aqueous solutions of cephalexin containing impurities may also be obtained by other methods.

The present invention has for its object a method of recovering cephalexin of high purity from a crude acidic aqueous solution of cephalexin.

The present invention, therefore, provides a process for the purification of crude cephalexin which comprises contacting a crude acidic, aqueous solution of cephalexin with methanol, adjusting the pH of the solution to about 4 to initiate crystallization of the cephalexin, thereafter if desired adding a non-solvent for cephalexin, e.g. a ketone, and separating off the mother liquor after crystallization has taken place to the desired extent.

It is believed that the methanol plays a dual role in the process according to the invention. In addition to taking up any impurities present, it appears that the methanol delays crystallization of the cephalexin thereby giving the crystals more time to form with concomitant improvement in quality.

When the cephalexin is present in an acidic solution, which would be the case if it were formed from the aforesaid zinc/acid reduction of 2,2,2-trichloroethyl 7β[D(-)-N-(2,2,2-trichloroethoxycarbonyl)-2-aminophenyl-acetamido]-3-methylceph-3-em-4-carboxylate or the like precursor, the pH of the solution may be adjusted to about 4 by the addition of an inorganic or organic base. Preferably the base should be water-soluble and suitable bases include alkali metal hydroxides, e.g. sodium hydroxide, and nitrogeneous bases such as ammonia, triethylamine, morpholine, ethanolamine etc.

The crystallization of cephalexin which begins when the pH of the solution is adjusted to about 4 may be controlled by the addition of a non-solvent for cephalexin such as a water-miscible ketone e.g. acetone or methyl ethyl ketone.

While the quantity of methanol added to the aqueous solution is not critical, good results may be obtained by adding a volume of methanol approximately equal to the volume of the aqueous solution. Volumes of methanol ranging from 25–70 percent v/v may be used.

The process according to the invention enables cephalexin of high purity to be obtained.

In order that the invention may be well understood the following examples are given by way of illustration only.

EXAMPLE 1

A solution of 2,2,2-trichlorethyl 7β-[D(-)-N-(2,2,2-trichloroethoxycarbonyl)-2-aminophenylacetamido]-3-methylceph-3-em-4-carboxylate containing 0.5 mole methyl isobutyl ketone (300 g) in 98 percent formic acid (1,200 ml) was treated with zinc dust (225 g.). After the reaction and removal of zinc the formic acid solution (ca 2.5 l) was concentrated to 300 ml. and acetic acid (240 ml.) was added. This was again concentrated to 260 ml. and diluted to 450 ml. with acetic acid. This solution was shaken with water (500 ml.) and ether (2.4 l.). The aqueous layer was separated and the ethereal layer washed with water (2 × 50 ml.). The extracts were combined and a portion corresponding to 105 g. of the starting material was diluted to 200 ml. with methanol and warmed to 40°. The pH was adjusted to 4.0 with triethylamine and the mixture allowed to cool. The slurry was diluted to 400 ml. with acetone and was cooled for 2 hours. Filtration gave the product, cephalexin, (34.8 g., 67.3 percent) having $[\alpha]_D +149°$ (c 1.0 in $H_2O$). λmax. 261 $E_{1cm}^{1\%}$ 221 in $H_2O$.

EXAMPLE 2

A solution of 2,2,2-trichloroethyl 7β-[D(-)-N-(2,2,2-trichloroethoxycarbonyl)-2-aminophenylacetamido]-3-methylceph-3-em-4-carboxylate containing 0.5 mole of methyl isobutyl ketone (50 g) in 98 percent formic acid (0.2 liters) was treated with zinc dust (39.2 g). After the reaction and removal of zinc the formic acid solution (ca 0.4 liters) was concentrated in vacuo to 50 ml. and diluted with methanol (75 ml.) containing concentrated hydrochloric acid (6 ml.). The mixture was heated under reduced pressure (508 mm Hg) until no more methyl formate distilled off (ca 0.5 hour) and was then diluted to 150 ml. with methanol. The pH was adjusted to 4.0 with triethylamine and the mixture was allowed to stand for 1 hour and was then diluted with acetone to 300 ml. The mixture was cooled for 1 hour and filtered to give cephalexin (15.2 g.) 62 percent yield (theory) having $[\alpha]_D +148°$ (c 1.0 in $H_2O$). λ max 261 nm $E_{1cm}^{1\%}$ 214 in $H_2O$, n.m.r. spectrum identified the material as cephalexin.

EXAMPLE 3

A solution of 2,2,2-trichloroethyl 7β-[D(-)-N-(2,2,2-trichloroethoxycarbonyl)-2-aminophenylacetamido]-3-methylceph-3-em-4-carboxylate containing 0.5 mole of methyl isobutyl ketone (200 g.) in 98 percent formic acid (800 ml.) was treated with a suspension of zinc dust (150 g.). After reaction and removal of zinc, the solution (ca 1.6 l.) was concentrated in vacuum to 200 ml. and acetic acid (170 ml.) was added. This was again concentrated to 200 ml. and more acetic acid (170 ml.) was added. This solution was concentrated to 260 ml; and acetic acid (60 ml.) and water (200 ml.) were added. The solution was extracted with ether (1600 ml.) containing water (50 ml.) and the ethereal layer was washed with water (60 ml. and 40 ml.). The combined aqueous layers were treated in portions as follows:

a. The solution (100 ml.) was diluted with methanol (25 ml.) and was warmed to 40° C. The pH of the solution was adjusted to 4.0 with triethylamine and the mixture was allowed to stand for 0.25 hour. Acetone (125 ml.) was added and the mixture was cooled and filtered to give cephalexin in 81 percent yield (theory) having $[\alpha]_D +149°$ $\lambda_{max}$. 261 nm $E_{1cm}^{1\%}$ 218 in $H_2O$.

b. The solution (100 ml.) was diluted with methanol (54 ml.) and was warmed to 40°. The pH of the solution was adjusted to 4.0 with triethylamine and the mixture was allowed to stand for 0.25 hour. Acetone (154 ml.) was added and the mixture was cooled and filtered to give cephalexin in 81.3 percent yield (theory) having $[\alpha]_D +149°$ $\lambda_{max}$. 261 nm $E_{1cm}^{1\%}$ 218 in $H_2O$ c. The solution (100 ml.) was diluted with methanol (100 ml.) and was warmed to 40°. The pH was adjusted with triethylamine to 4.0 and the mixture was allowed to stand for 0.25 hour. Acetone (200 ml.) was added and the mixture was cooled and filtered to give cephalexin in 76.3 percent yield (theory) having $[\alpha]_D +149°$ $\lambda_{max}$. 261 nm $E_{1cm}^{1\%}$ 218 in $H_2O$ d. The solution (100 ml.) was diluted with methanol (300 ml.) and was warmed to 40°. The pH of the solution was adjusted to 4.0 with triethylamine and the mixture was allowed to stand for 0.25 hour. Acetone (400 ml.) was added and the mixture was cooled and filtered to give cephalexin in 62.2 percent yield (theory) having $[\alpha]_D +151°$ $\lambda_{max}$. 261 nm. $E_{1cm}^{1\%}$ 220 in $H_2O$.

EXAMPLE 4

An aqueous solution of reaction product was obtained as described in Example (3) above from 300 g. of starting material. This was diluted with an equal volume of methanol and divided into 5 parts which were treated as follows:

a. The solution was warmed to 40° and the pH was adjusted to 4.0 with triethylamine. The mixture was left to stand for 1 hour and diluted with an equal volume of acetone. The mixture was cooled and filtered to give cephalexin in 84 percent yield (theory) having $[\alpha]_D$ +149.5° (c, 1.0 in $H_2O$) $\lambda_{max.}$ 261 nm $E_{1cm.}^{1\%}$ 218 in $H_2O$ b. The solution was treated in a similar manner with ammonium hydroxide solution ($d = 0.88$) in place of triethylamine. Cephalexin was obtained in 81.3 percent yield (theory) having $[\alpha]_D$ +148.5° (C, 1.0 in $H_2O$) $\lambda_{max.}$ 261 nm $E_{1cm.}^{1\%}$ 218 in $H_2O$.

c. The solution was treated in a similar manner using 6N sodium hydroxide. Cephalexin was obtained in 81.3 percent yield (theory) having $[\alpha]_D$ +149.5° (C, 1.0 in $H_2O$) $\lambda_{max.}$ 261 nm $E_{1cm.}^{1\%}$ 216 in $H_2O$.

d. The solution was treated in a similar manner with ethanolamine as base. Cephalexin was obtained in 80.7 percent yield (theory) having $[\alpha]_D$ +149° (c, 1.0 in $H_2O$) $\lambda_{max.}$ 261 nm. $E_{1cm.}^{1\%}$ 219 in $H_2O$.

e. The solution was treated in a similar manner using morpholine as base. Cephalexin was obtained in 79 percent yield having $[\alpha]_D$ +150° (c, 1.0 in $H_2O$) 261 nm. $E_{1cm.}^{1\%}$ 218 in $H_2O$.

EXAMPLE 5

An aqueous solution of reaction product was obtained as described in Example (3) above from 40 g. of starting material. This was diluted with an equal volume of methanol and divided into two parts which were treated as follows:

a. The solution was warmed to 40° and taken to pH 4 with triethylamine. The mixture was diluted with an equal volume of acetone and cooled. Filtration gave cephalexin in 78 percent yield (theory) having $[\alpha]_D$ +150° (c, 1.0 in $H_2O$) $\lambda_{max.}$ 261 nm. $E_{1cm.}^{1\%}$ 223 in $H_2O$.

b. The solution was taken to pH 4 with triethylamine and cooled. Filtration gave cephalexin in 74.5 percent yield (theory) having $[\alpha]_D$ +149° (c, 1.0 in $H_2O$). $\lambda_{max.}$ 261 nm. $E_{1cm.}^{1\%}$ 221 in $H_2O$.

I claim:

1. A process for the recovery of cephalexin of high purity from a crude acidic aqueous solution of cephalexin resulting from the zinc/acid reduction of 2,2,2-trichloroethyl 7β-[D(-)-N-(2,2,2-trichloroethoxycarbonyl)-2-aminophenylacetamido]-3-methylceph-3-em-4-carboxylate, which comprises contacting said solution with from 25–70percent v/v of methanol, adjusting the pH of the solution to about 4 with a water soluble base to initiate crystallization of the cephalexin and separating off the mother liquor after crystallization has taken place to the desired extent, said methanol taking up impurities and maintaining them in solution in the mother liquor.

* * * * *